United States Patent
Park et al.

(10) Patent No.: US 10,799,758 B2
(45) Date of Patent: Oct. 13, 2020

(54) SCREEN GOLF SYSTEM, METHOD OF REALIZING IMAGE FOR SCREEN GOLF, AND COMPUTING-DEVICE-READABLE RECORDING MEDIUM HAVING THE SAME RECORDED THEREIN

(71) Applicant: GOLFZON CO., LTD., Daejeon (KR)

(72) Inventors: Jung Ho Park, Seoul (KR); Jea Ha Yoo, Seoul (KR)

(73) Assignee: GOLFZON CO., LTD., Daejeon (KR)

( * ) Notice: Subject to any disclaimer, the term of this patent is extended or adjusted under 35 U.S.C. 154(b) by 0 days.

(21) Appl. No.: 16/085,588

(22) PCT Filed: Mar. 14, 2017

(86) PCT No.: PCT/KR2017/002744
§ 371 (c)(1),
(2) Date: Sep. 17, 2018

(87) PCT Pub. No.: WO2017/160057
PCT Pub. Date: Sep. 21, 2017

(65) Prior Publication Data
US 2019/0091512 A1    Mar. 28, 2019

(30) Foreign Application Priority Data
Mar. 17, 2016    (KR) .................. 10-2016-0032387

(51) Int. Cl.
*A63B 24/00*    (2006.01)
*A63B 67/02*    (2006.01)
(Continued)

(52) U.S. Cl.
CPC .......... *A63B 24/0006* (2013.01); *A63B 24/00* (2013.01); *A63B 67/02* (2013.01);
(Continued)

(58) Field of Classification Search
CPC ..... A63B 24/0006; A63B 24/00; A63B 67/02; A63B 69/3661; A63B 69/3673;
(Continued)

(56) References Cited

U.S. PATENT DOCUMENTS

| | | | | |
|---|---|---|---|---|
| 2004/0239885 A1* | 12/2004 | Jaynes | ................. | H04N 9/3147 353/30 |
| 2009/0027304 A1* | 1/2009 | Aufranc | ................. | G03B 21/00 345/1.3 |
| 2014/0354963 A1* | 12/2014 | Kim | ..................... | H04N 9/3194 353/94 |

FOREIGN PATENT DOCUMENTS

| | | |
|---|---|---|
| JP | 1991-046376 U | 4/1991 |
| JP | 2004-334145 A | 11/2004 |

(Continued)

OTHER PUBLICATIONS

International Search Report for PCT/KR2017/002744 dated Jun. 20, 2017 from Korean Intellectual Property Office.

*Primary Examiner* — Werner G Garner
(74) *Attorney, Agent, or Firm* — Revolution IP, PLLC

(57) ABSTRACT

Disclosed herein are a screen golf system and a method of realizing an image for screen golf that are capable of outputting an image to a floor screen using an image output device that has a resolution different from the resolution of an image output device that outputs an image to a front screen, in a user golf play space, and of realizing the image output to the front screen and the image output to the floor screen as a single image in order to solve a problem whereby it is impossible to output images to the front screen and to the floor screen using a single image output device.

7 Claims, 4 Drawing Sheets

(51) Int. Cl.
  *G09B 19/00* (2006.01)
  *A63B 71/06* (2006.01)
  *A63B 69/36* (2006.01)
  *A63B 71/04* (2006.01)
  *G09B 1/00* (2006.01)
  *H04N 1/00* (2006.01)
  *H04N 11/00* (2006.01)

(52) U.S. Cl.
  CPC ...... *A63B 69/3661* (2013.01); *A63B 69/3673* (2013.01); *A63B 71/04* (2013.01); *A63B 71/06* (2013.01); *G09B 19/00* (2013.01); *G09B 19/0038* (2013.01); *A63B 2071/0636* (2013.01); *H04N 11/00* (2013.01)

(58) Field of Classification Search
  CPC . A63B 71/04; A63B 71/06; A63B 2071/0636; G09B 19/00; G09B 19/0038; H04N 13/00; H04N 11/00
  See application file for complete search history.

(56) References Cited

FOREIGN PATENT DOCUMENTS

| | | |
|---|---|---|
| KR | 10-2010-0124899 A | 11/2010 |
| KR | 10-1031475 B1 | 4/2011 |
| KR | 10-2011-0125526 A | 11/2011 |
| KR | 10-2012-0036156 A | 4/2012 |
| KR | 10-2014-0106351 A | 9/2014 |

\* cited by examiner

SCREEN GOLF SYSTEM, METHOD OF REALIZING IMAGE FOR SCREEN GOLF, AND COMPUTING-DEVICE-READABLE RECORDING MEDIUM HAVING THE SAME RECORDED THEREIN

TECHNICAL FIELD

The present invention relates to a screen golf system and a method of realizing an image for screen golf, and more particularly to a screen golf system and a method of realizing an image for screen golf that are capable of realizing an image simulating the trajectory of a golf ball hit by a user on a virtual golf course realized as an image through a screen based on the sensing result of the golf ball such that the user can play a round of golf or practice golf in a virtual space.

BACKGROUND ART

With the recent upsurge in the number of golfers, a so-called screen golf system, which enables a golfer to practice golf and to play a round of virtual golf using a virtual golf simulation system, has gained popularity.

The screen golf system senses the velocity and direction of a golf ball that a golfer hits onto a screen installed indoors to display a virtual golf course and displays the progress of the golf ball on the screen. The technology of the screen golf system has evolved in order to enable a user to feel the same realism that the user feels when playing a round of golf on an actual golf course, which exceeds the level of enjoyment of a golf game that is simply played indoors.

However, a general screen golf system is limited in its ability to provide the same sense of realism that the user feels when the user plays a round of golf on an actual golf course because a virtual golf course and an image simulating the trajectory of a golf ball on the virtual golf course are realized only through a screen installed in front of the location at which the user hits the golf ball.

In order to overcome this limitation and to provide greater realism to users who enjoy screen golf, technology for realizing an image on a floor between the front screen and a shot plate as well as on the front screen has been proposed.

Korean Patent Application No. 10-2009-0043833 (entitled SCREEN GOLF SYSTEM USING STEREOSCOPIC IMAGE), Japanese Utility Model Application Publication No. 1991-046376 (entitled GOLF PLAY APPARATUS), and Japanese Patent Application Publication No. 2004-334145 (entitled METHOD OF THREE-DIMENSIONALLY CONFIGURING SCREEN TO DISPLAY SPACE) are disclosed as prior art documents related thereto.

As can be seen from the prior art documents, conventionally, a first projector is used to output an image to a front screen, and a second projector is used to output an image to a floor screen. In order to constitute the image output to the front screen and the image output to the floor screen as a single image, the image output from the first projector and the image output from the second projector are coupled to each other using an edge-blending method.

However, it is possible to use the edge-blending method only in the case in which the image output from the first projector and the image output from the second projector have the same resolution.

In the general screen golf system, however, the distance between the front screen and the first projector, which outputs an image to the front screen, is very long, whereas the distance between the ceiling and the floor in an indoor space, in which the screen golf system is installed, is limited.

As a result, it is substantially impossible to adjust the distance between the floor screen and the second projector, which outputs an image to the floor screen, so as to be equal to the distance between the front screen and the first projector.

That is, it is impossible in practice to output images to the front screen and to the floor screen using a single image output device and to couple the two images to each other.

DISCLOSURE

Technical Problem

The present invention has been made in view of the conventional problem whereby it is impossible to output images to a front screen and to a floor screen using a single image output device, and it is an object of the present invention to provide a screen golf system and a method of realizing an image for screen golf that are capable of outputting an image to a floor screen using an image output device that has a resolution different from the resolution of an image output device that outputs an image to a front screen, in a user golf play space, and of realizing the image output to the front screen and the image output to the floor screen as a single image.

Technical Solution

In accordance with an aspect of the present invention, the above and other objects can be accomplished by the provision of a screen golf system including a first image output device for outputting an image to a front screen provided in front of the location at which a user hits a golf ball, a second image output device for outputting an image to a floor screen provided on a floor between a shot plate, on which the user takes a golf swing, and the front screen, and an image-processing device for generating an image to be output, dividing the generated image into a first image, which will be output through the first image output device, and a second image, which will be output through the second image output device, processing at least one of the first image and the second image so as to correspond to the resolution of at least one of the first image output device and the second image output device, and transmitting the processed images to the first image output device and to the second image output device such that the generated image is output to the front screen and to the floor screen.

The image-processing device may be configured to generate a two-dimensional image of a three-dimensional virtual golf course as an image to be output, to transmit the first image of the three-dimensional virtual golf course to the first image output device so as to be output to the front screen, to process the portion of the second image of the three-dimensional virtual golf course that corresponds to the floor of the three-dimensional virtual golf course as a two-dimensional image, and to transmit the processed image to the second image output device such that the image of the floor portion, connected to the image that is output to the front screen, is output to the floor screen.

The first image output device and the second image output device may be configured to output images having different resolutions, and the image-processing device may be configured to generate the first image and the second image based on the resolution that can be output from the first image output device, to transmit the first image to the first image output device so as to be output to the front screen, to process the second image so as to have a resolution that can be output from the second image output device, and to transmit the processed second image to the second image output device to as to be output to the floor screen.

The second image output device may be set and installed to output an image having a resolution different from the resolution of the image output from the first image output device such that the horizontal length of the image output from the second image output device is substantially equal to the horizontal length of the image output from the first image output device.

The second image output device may be configured to output an image having a resolution lower than the resolution of the image output from the first image output device, the image-processing device may be configured to generate the first image and the second image based on the resolution that can be output from the first image output device, to transmit the first image to the first image output device so as to be output to the front screen, to convert the second image so as to have an image size corresponding to the resolution that can be output from the second image output device, and to transmit the converted second image to the second image output device, and the second image output device may be set and installed to output the image received from the image-processing device such that the horizontal length of the image received from the image-processing device is substantially equal to the horizontal length of the image output from the first image output device.

The screen golf system may further include a camera device for acquiring an image having an angle of view including the front screen and the floor screen, wherein the image-processing device may be configured to analyze the image acquired by the camera device in order to determine whether the image on the front screen and the image on the floor screen are offset from each other and, upon determining that the image on the front screen and the image on the floor screen are offset from each other, to control one of the first image output device and the second image output device in order to shift one of the image on the front screen and the image on the floor screen such that the image on the front screen and the image on the floor screen substantially coincide with each other.

In accordance with another aspect of the present invention, there is provided a method of realizing an image for screen golf in which images are output to a front screen provided in front of a location at which a user hits a golf ball and to a floor screen provided on a floor between a shot plate, on which the user takes a golf swing, and the front screen, such that the image on the front screen and the image on the floor screen are output as a single image, the method including generating the single image to be output, the image-processing device dividing the generated image into a first image and a second image and processing at least one of the first image and the second image so as to correspond to the resolution of an image to be output, a first image output device, configured to output an image to the front screen, outputting an image received from the image-processing device to the front screen in order to output an image corresponding to the first image, and a second image output device, configured to output an image to the floor screen, outputting an image received from the image-processing device to the floor screen in order to output an image corresponding to the second image.

The step of generating the single image to be output may include generating a two-dimensional image of a three-dimensional virtual golf course as the single image to be output, the step of outputting the image corresponding to the first image may include the image-processing device transmitting the first image of the three-dimensional virtual golf course to the first image output device such that the first image output device outputs the image to the front screen, and the step of outputting the image corresponding to the second image may include the image-processing device processing the portion of the second image of the three-dimensional virtual golf course that corresponds to the floor of the three-dimensional virtual golf course as a two-dimensional image and transmitting the processed image to the second image output device such that the second image output device outputs an image of a floor portion, connected to the image that is output to the front screen, to the floor screen.

The first image output device and the second image output device may be configured to output images having different resolutions, the step of generating the single image to be output may include generating the first image and the second image based on the resolution that can be output from the first image output device, the step of processing the image may include processing the second image so as to have a resolution that can be output from the second image output device, the step of outputting the image corresponding to the first image may include the first image output device receiving and outputting the first image from the image-processing device to the front screen, and the step of outputting the image corresponding to the second image may include the second image output device outputting the second image processed so as to have a resolution that can be output to the floor screen.

The second image output device may be configured to output an image having a resolution lower than the resolution of the image output from the first image output device, the step of generating the single image to be output may include generating the first image and the second image based on the resolution that can be output from the first image output device, the step of processing the image may include converting the second image so as to have an image size corresponding to the resolution that can be output from the second image output device, the step of outputting the image corresponding to the first image may include the first image output device receiving and outputting the first image from the image-processing device to the front screen, and the step of outputting the image corresponding to the second image may include the second image output device outputting the converted image to the floor screen such that the horizontal length of the converted image is substantially equal to the horizontal length of the image output from the first image output device.

In accordance with a further aspect of the present invention, there is provided a computing-device-readable recording medium having a program for performing the method of realizing the image for screen golf recorded therein.

Advantageous Effects

A screen golf system and a method of realizing an image for screen golf according to the present invention are capable of outputting an image to a floor screen using an image output device that has a resolution different from the resolution of an image output device that outputs an image to a front screen, in a user golf play space, and of realizing the image output to the front screen and the image output to the floor screen as a single image, whereby it is possible to solve a conventional problem in that it is impossible to output images to the front screen and to the floor screen using a single image output device.

BEST MODE

A screen golf system and a method of realizing an image for screen golf according to the present invention will be described in more detail with reference to the accompanying drawings.

First, the construction of a screen golf system according to an embodiment of the present invention will be described with reference to FIGS. 1 to 3.

Figure 1:
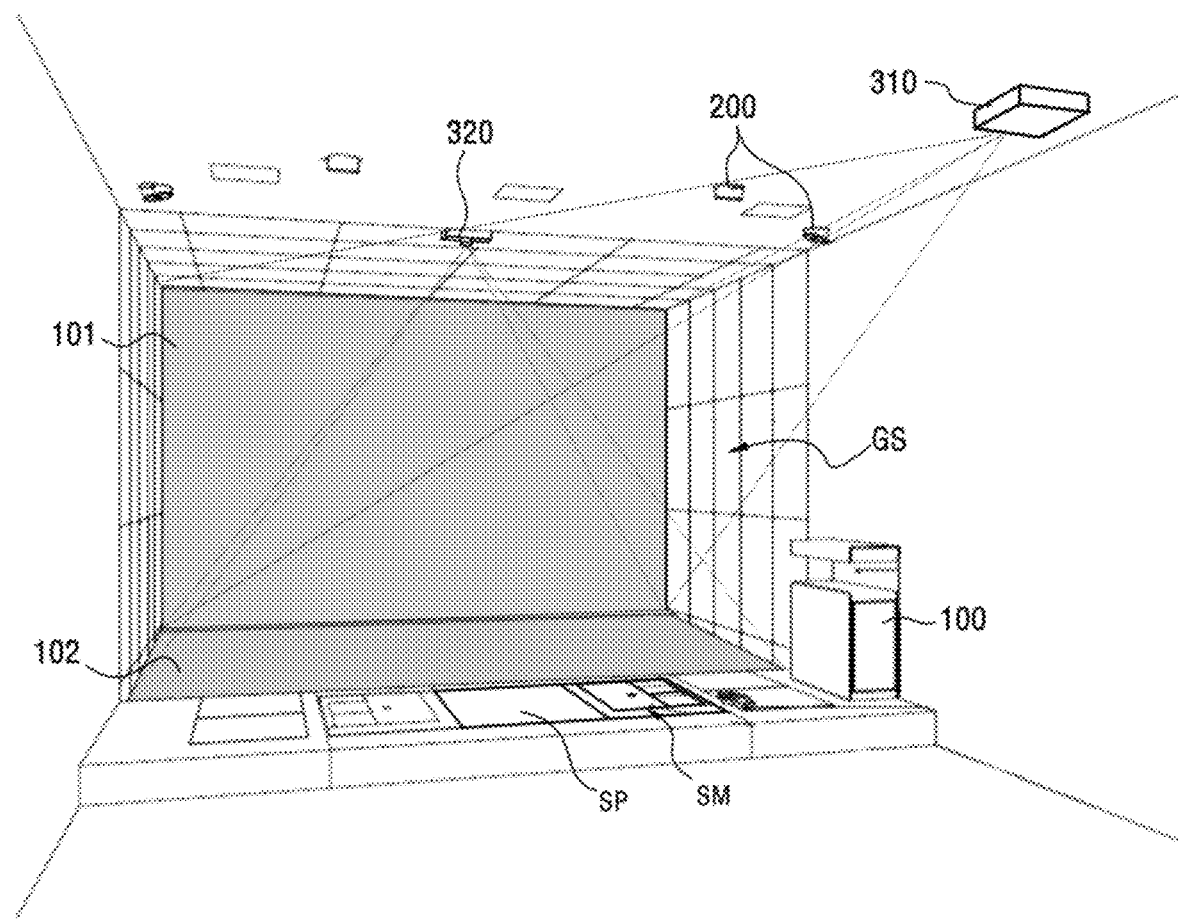
FIG. 1 is a view showing a user golf play space in which a screen golf system according to an embodiment of the present invention is realized.
Figure 2:
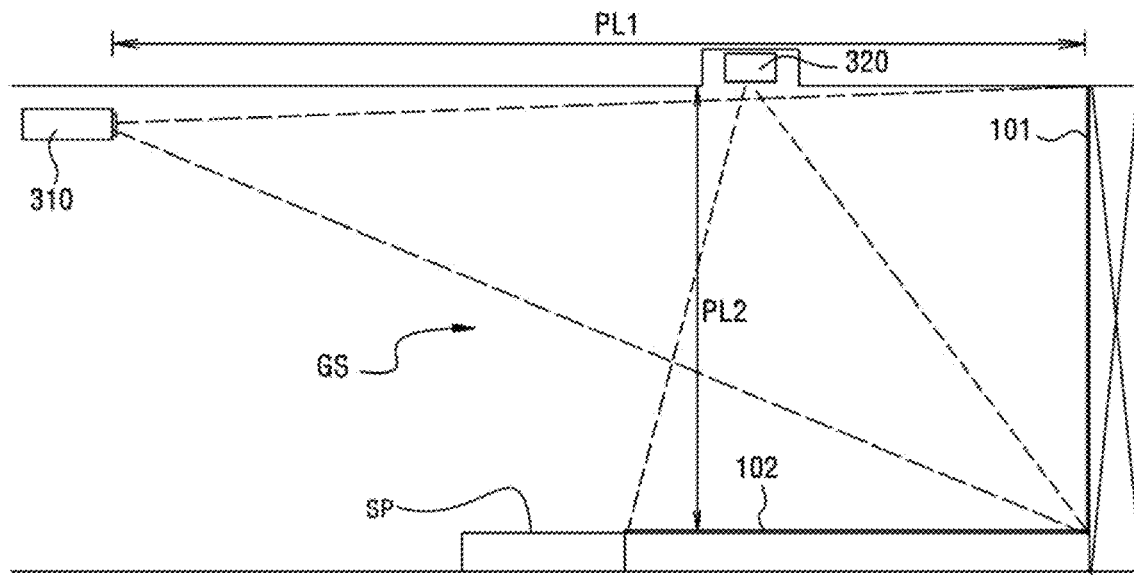
FIG. 2 is a side view of the user golf play space shown in FIG. 1.
Figure 3:
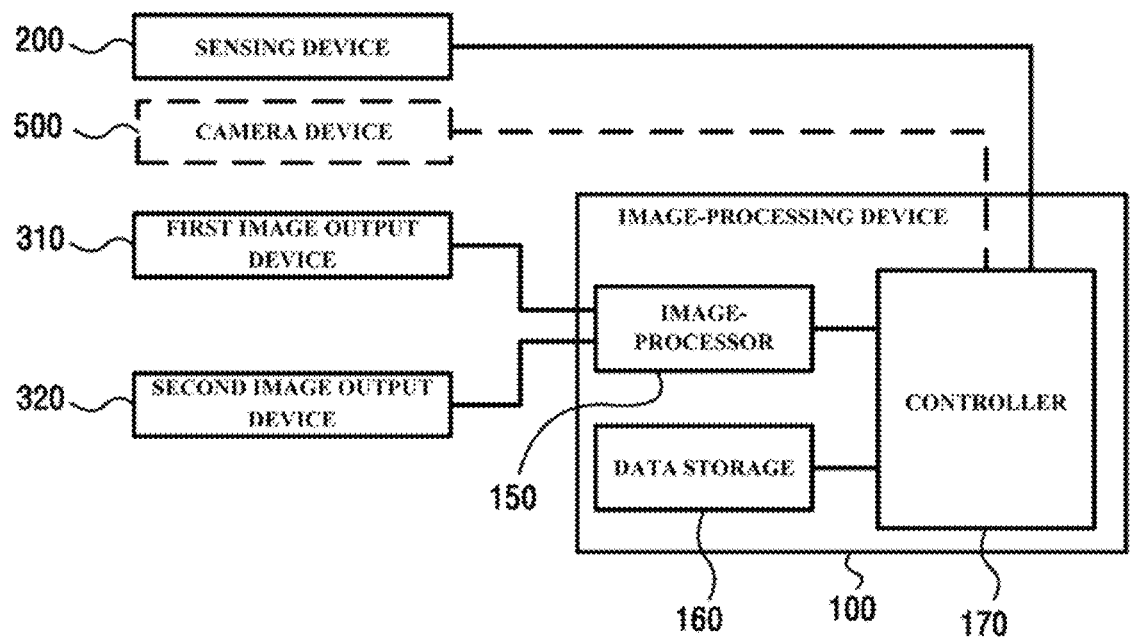
FIG. 3 is a block diagram showing the construction of the screen golf system according to the embodiment of the present invention.

FIG. 1 is a view showing a user golf play space in which a screen golf system according to an embodiment of the present invention is realized, FIG. 2 is a side view of the user golf play space shown in FIG. 1, and FIG. 3 is a block diagram showing the construction of the screen golf system according to the embodiment of the present invention.

As shown in FIGS. 1 to 3, the screen golf system according to the embodiment of the present invention may include an image-processing device 100, a sensing device 200, a first image output device 310, and a second image output device 320.

As shown in FIGS. 1 and 2, the screen golf system according to the embodiment of the present invention is configured such that a shot plate SP, on which a user takes a golf swing, a front screen 101, which is installed in front of a shot mat SM, on which a golf ball to be hit by the user using a golf club is placed, and a floor screen 102, which is installed on a floor between the front screen 101 and the shot plate SP, are provided in a golf play space GS having a predetermined size, whereby the user may play virtual golf using the screen golf system.

As shown in FIGS. 1 and 2, the first image output device 310 outputs an image to the front screen 101 while the second image output device 320 outputs an image to the floor screen 102 such that the image output to the front screen 101 and the image output to the floor screen 102 constitute a single image for virtual golf.

Here, the horizontal lengths of the front screen 101 and the floor screen 102 may be substantially equal to each other, and the vertical lengths of the front screen 101 and the floor screen 102 may be substantially equal to each other. Alternatively, at least the horizontal lengths of the front screen 101 and the floor screen 102 may be equal to each other.

That is, the front screen 101 and the floor screen 102 may be connected to each other in order to constitute a single screen, or may be provided separately. Even in the case in which the front screen 101 and the floor screen 102 are provided separately, images may be connected to each other in order to constitute a single image. For this reason, at least the horizontal lengths of the front screen 101 and the floor screen 102 may be equal to each other.

An image that is processed by the image-processing device 100 may be transmitted to the first image output device 310 and to the second image output device 320, which may output the processed image.

As shown in FIG. 3, the image-processing device 100 includes an image-processor 150, a data storage 160, and a controller 170. Basically, the image-processing device generates an image of a virtual golf course, in which the user plays golf, and outputs the generated image to the respective screens. In addition, the image-processing device generates a simulation image, in which a virtual ball moves, based on information about the motion of a golf ball sensed and calculated by the sensing device 200 when the user hits the golf ball on the shot plate SP, and outputs the generated simulation image to the respective screens.

Meanwhile, the sensing device 200 is a device that senses the motion of at least one of a golf club or a golf ball when the user takes a golf swing.

The sensing device 200 may be realized in any of various forms. The sensing device may be an infrared-sensor-type sensing device, which emits infrared rays, receives the infrared rays reflected by a golf club head or a ball that is moved when the user hits the ball, and analyzes the reflected infrared rays in order to sense the motion of the golf club head or the ball, a laser-sensor-type sensing device, which emits laser beams and then senses and analyzes the laser beams blocked by a golf club head or a ball that is moved in order to sense the motion of the golf club head or the ball, or an image-sensor-type sensing device, which collects and analyzes images of a ball hit as the result of the user taking a golf swing using a golf club in order to sense the motion of the ball.

FIG. 1 shows the case in which the sensing device is an image-sensor-type sensing device. The image-sensor-type sensing device 200 is well known through prior art documents, and therefore a detailed description thereof will be omitted.

Hereinafter, the respective elements of the image-processing device 100 will be described. The data storage 160 may be configured to store various kinds of information about the operation of the screen golf system according to the embodiment of the present invention and to store image data necessary to realize a virtual golf course image.

Alternatively, data necessary to realize a virtual golf course image may be stored in a database of a server (not shown), a piece of the data necessary to realize the virtual golf course image selected by the user may be extracted from the database of the server and may then be transmitted to the image-processing device 100, and the transmitted data may be temporarily stored in the data storage 160.

The image-processor 150 is configured to process all images related to virtual golf simulation, such as an image of a virtual golf course, an image of the motion of a ball, and an image for menu selection, as data received from the data storage 150 or from the server (not shown).

The controller 170 is configured to perform various calculations for virtual golf simulation and control of the respective elements.

In particular, the controller 170 controls the image-processor 150 such that an image that is output through the respective image output devices 310 and 320, such as an image of a virtual golf course or a simulation image in which a virtual ball is moved, is generated by the image-processor 150, such that the generated image is divided into a first image, which is output through the first image output device 310, and a second image, which is output through the second image output device 320, and such that at least one of the first image and the second image is processed so as to correspond to the resolution of at least one of the first image output device and the second image output device.

After the image is processed by the image-processor 150, the first image or an image obtained by processing the first image is transmitted to the first image output device 310, which outputs the same to the front screen 101, and the second image or an image obtained by processing the second image is transmitted to the second image output device 320, which outputs the same to the floor screen 102.

As shown in FIGS. 1 and 2, in the golf play space GS, which is provided for general screen golf, the distance from the front screen 101 to the rear side may be increased, but the height from the floor to the ceiling is relatively short. For this reason, the first image output device 310 and the second image output device 320 may not have the same resolution.

That is, as shown in FIG. 2, on the assumption that the distance from the first image output device 310 to the front screen 101 is PL1 and that the distance from the second image output device 320 to the floor screen 102 is PL2, it is necessary to increase PL2 so as to be equal to PL1, which is impossible in practice, in the case in which a device having the same resolution as the first image output device 310 is used as the second image output device 320, since PL2 is much shorter than PL1.

According to the present invention, therefore, the first image output device 310 and the second image output device 320 have different resolutions. That is, the screen golf system according to the embodiment of the present invention is configured such that the second image output device 320 outputs an image to the floor screen 102 from the distance PL2 so as to have the same size as an image that the first image output device 310 outputs to the front screen 101 from the distance PL1 (or so as to have at least the same horizontal length as the image). Consequently, it is possible to output the front screen image and the floor screen image as a single image without using a conventional edge-blending method.

A method of realizing the front screen image and the floor screen image as a single image using two image output devices having different resolutions as described above will be described in detail with reference to FIGS. 4 and 5.

The controller of the image-processing device of the screen golf system according to the embodiment of the present invention controls the image-processor such that the image-processor generates a single image as a whole in consideration both of an image part to be output to the front screen 101 and of an image part to be output to the floor screen 102.

The generated entire image is divided into two parts, one of which is processed if necessary. The two image parts are transmitted to the first image output device 310 and to the second image output device 320, which output the respective image parts.

The image-processing device of the screen golf system according to the embodiment of the present invention generates a two-dimensional image of a three-dimensional virtual golf course as an image to be output, divides the generated image into a first image and a second image, transmits the first image of the three-dimensional virtual golf course to the first image output device 310 so as to be output to the front screen 101, processes the portion of the second image of the three-dimensional virtual golf course that corresponds to the floor of the three-dimensional virtual golf course as a two-dimensional image, and transmits the processed image to the second image output device 320 such that the image of the floor portion connected to the image that is output to the front screen is output to the floor screen 102, whereby it is possible to enable the user to feel the same realism that the user feels when playing golf on an actual golf course.

Figure 4:
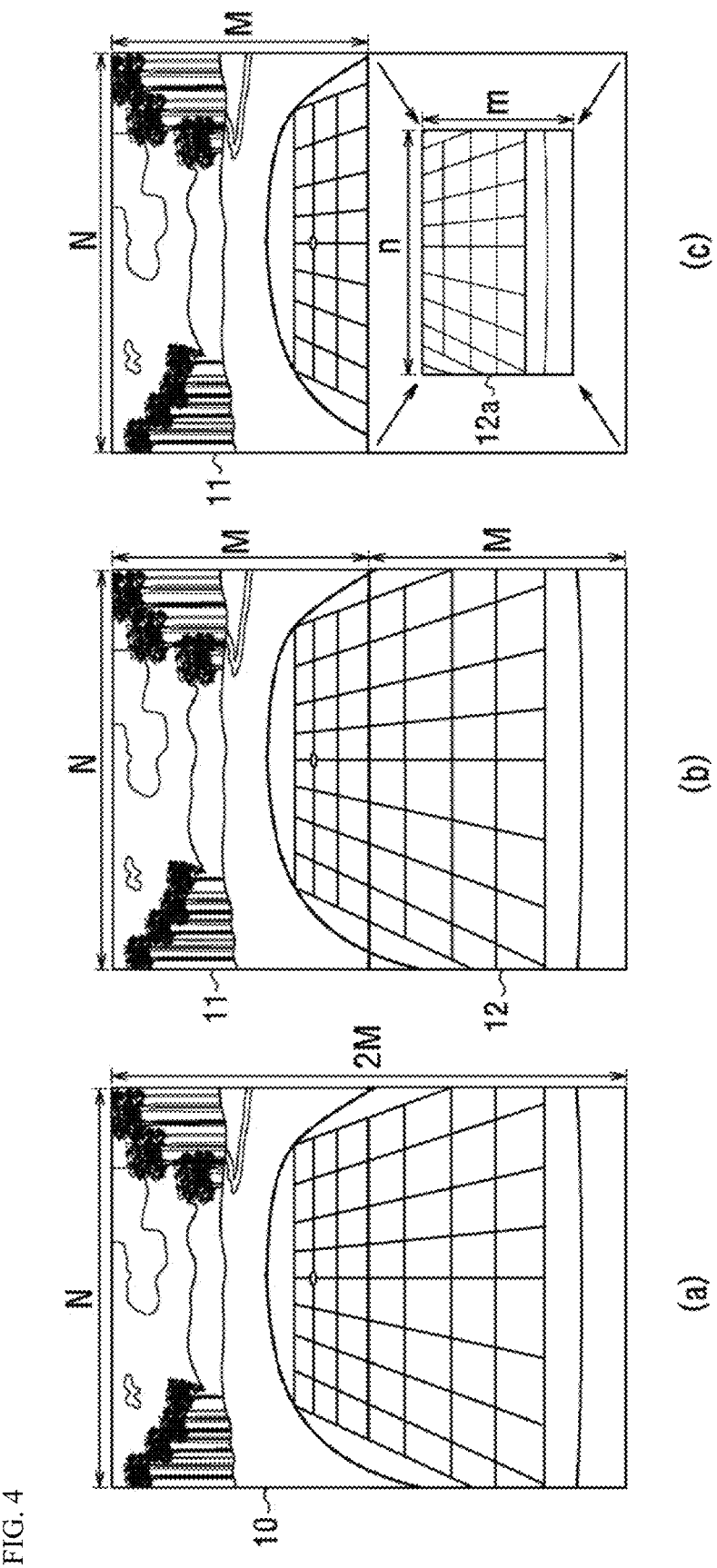
FIG. 4 illustrates (a), (b) and (c) showing a process of generating an image that is processed by an image-processing device of the screen golf system according to the embodiment of the present invention and that is transmitted to a first image output device and a second image output device.

FIG. 4 is a view showing a process in which the image-processing device of the screen golf system according to the embodiment of the present invention generates an image to be output, divides the generated image into two image parts, and converts one of the image parts through necessary image processing, i.e. a process in which the image is processed before the image is transmitted to the first image output device and to the second image output device.

In the screen golf system according to the embodiment of the present invention, as shown in FIGS. 1 and 2, the first image output device 310 is capable of directly outputting the image processed by the image-processing device, since sufficient distance to the front screen can be secured. However, there is no other way but to use a device that outputs an image having a resolution lower than the resolution of the image output from the first image output device as the second image output device 320, since the distance to the floor screen is short.

Consequently, the image that is transmitted to the first image output device 310 and the image that is transmitted to the second image output device 320 have different resolutions. Since the resolutions of the two images are different from each other, it is difficult to couple the two images to each other using a conventional edge-blending method.

In order to output a single image using two image output devices having different resolutions, the image-processing device of the screen golf system according to the embodiment of the present invention generates an image to be output to the front screen and an image to be output to the floor screen as an entire image based on the resolution that can be output from the first image output device, divides the generated entire image into a first image and a second image, transmits the first image to the first image output device so as to be output to the front screen, processes the second image so as to have a resolution that can be output from the second image output device, and transmits the processed second image to the second image output device to as to be output to the floor screen.

Hereinafter, it is assumed that the resolution of an image that can be output by the first image output device is $N \times M$ and that the resolution of an image that can be output by the second image output device is $n \times m$ (where $N > n$ and $M > m$).

As shown in FIG. 4($a$), the image-processing device of the screen golf system according to the embodiment of the present invention generates an entire image 10 having a resolution of $N \times 2M$.

Subsequently, as shown in FIG. 4($b$), the image-processing device divides the entire image 10 into a first image 11 having a resolution of $N \times M$ and a second image 12 having a resolution of $N \times M$. In this case, the image to be output to the front screen and the image to be output to the floor screen are the same size. Alternatively, the image to be output to the front screen and the image to be output to the floor screen may have the same horizontal length (the number of pixels in the horizontal direction: N) but may have different vertical lengths (the number of pixels in the vertical direction). Hereinafter, a description will be given on the assumption that the image to be output to the front screen and the image to be output to the floor screen are the same size.

As shown in FIG. 4(c), the first image 11, which has a size of N×M, can be directly transmitted to the first image output device so as to be output to the front screen. However, the second image 12 cannot be directly transmitted to the second image output device.

Consequently, the image-processing device processes the second image 12, which has a size (resolution) of N×M, into an image having a size (resolution) of n×m through an image size conversion process.

That is, a portion corresponding to a size of n×m is not cut from the second image, which has a size of N×M, but the entirety of the second image, which has a size of N×M, is reconfigured so as to have a size (resolution) of n×m. The image processed so as to have a size of n×m is denoted by reference symbol 12a.

Since the entire image constituted by the first image 11 and the second image 12 is a two-dimensional image of a three-dimensional virtual golf course, it is necessary to convert the second image into a two-dimensional image of a floor in an image of a three-dimensional space in consideration of the fact that the second image 12 is an image to be output to the floor screen.

Figure 5:
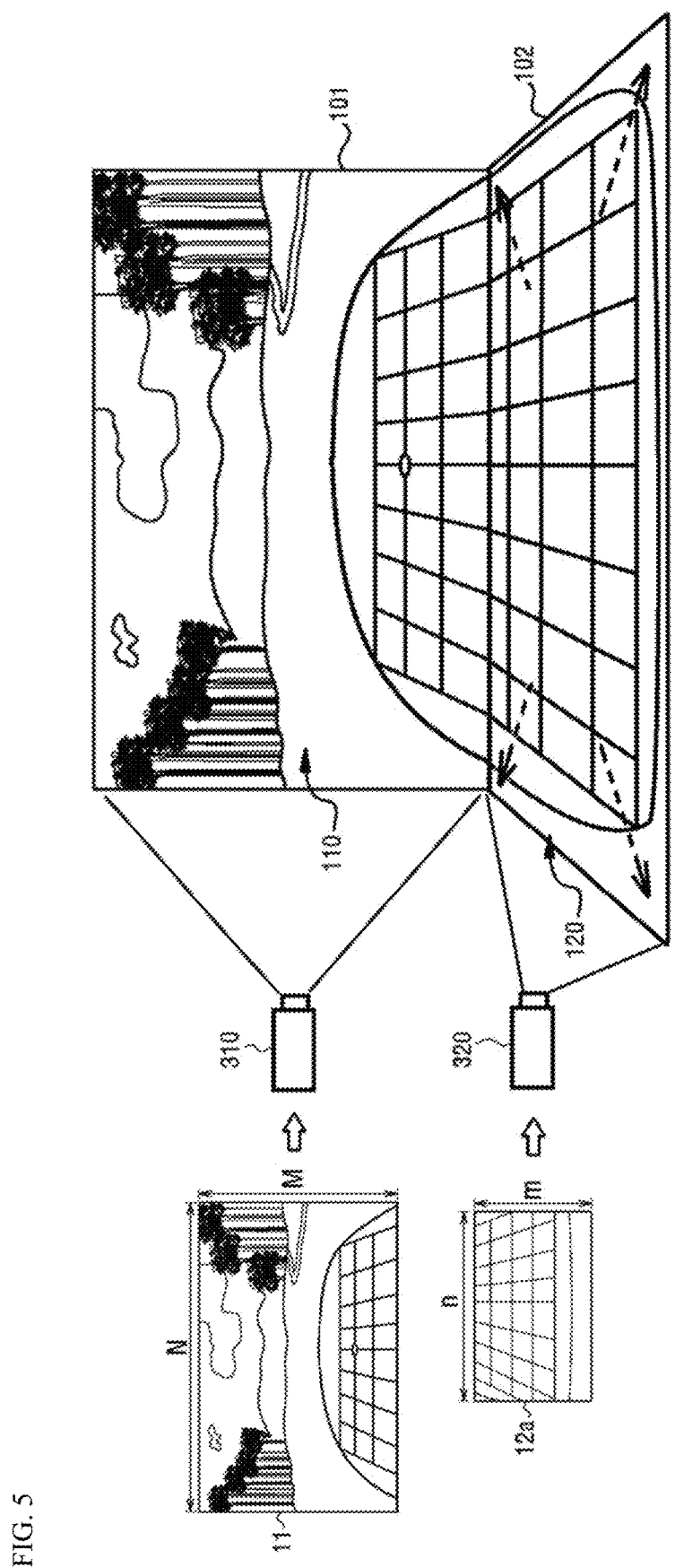
FIG. 5 is a view showing the case in which the image processed by the image-processing device of the screen golf system according to the embodiment of the present invention is output through the first image output device and the second image output device.

Meanwhile, FIG. 5 is a view showing the case in which the first image 11, which has a size of N×M, is output to the front screen 101 through the first image output device 310 and is displayed as a front screen image 110, and at the same time, the image 12a (having a resolution of n×m), obtained by processing the second image, is output to the floor screen 102 through the second image output device 320 and is displayed as a floor screen image 120.

The second image output device 320 outputs an image having a resolution of n×m. As a result, the front screen image 110, which is an image having a resolution of N×M, and the floor screen image 120, which is an image having a resolution of n×m, have different sizes.

As shown in FIG. 5, therefore, the second image output device of the screen golf system according to the embodiment of the present invention physically enlarges the image 12a, received from the image-processing device, and outputs the enlarged image to the floor screen 102 in order to realize the floor screen image 120 in the state of being contiguous with the front screen image 110.

Here, that the second image output device 320 physically enlarges the image 12a and then outputs the enlarged image to the floor screen 102 does not mean that an image having a resolution of n×m is converted into an image having a resolution of N×M but means that an image having a resolution of n×m is physically enlarged into an image having a resolution of N×M through the refraction of a lens assembly provided in the second image output device 320, after which the enlarged image is output.

That is, in FIG. 5, even though the front screen image 110 has a resolution of N×M and the floor screen image 120 has a resolution of n×m, the output images have the same size (dimensions).

To this end, the location at which the second image output device is installed and the refraction state and the focal distance of the lens assembly provided in the second image output device may be preset such that an image having a resolution of n×m can be output while having the same size (dimension) as an image having a resolution of N×M.

Meanwhile, in the case in which the front screen image 110 is realized using the first image output device 310 and the floor screen image 120 is realized using the second image output device 320, as described above, the two images may be offset from each other.

As shown in FIG. 3, a screen golf system according to another embodiment of the present invention may further include a camera device 500. The camera device 500 may be configured to acquire an image having an angle of view including the front screen 101 and the floor screen 102.

In addition, an image-processing device 100 according to another embodiment of the present invention may analyze the image acquired by the camera device 500 in order to determine whether the front screen image 110 and the floor screen image 120 are offset from each other. Upon determining that the front screen image 110 and the floor screen image 120 are offset from each other, the image-processing device controls one of the first image output device 310 and the second image output device 320 in order to shift one of the front screen image 110 and the floor screen image 120 such that the front screen image 110 and the floor screen image 120 substantially coincide with each other.

As is apparent from the above description, the screen golf system and the method of realizing the image for screen golf according to the present invention have an advantage in that, in the user golf play space, an image is output to the floor screen using the second image output device, which has a resolution different from the resolution of the first image output device, which outputs an image to the front screen, such that the front screen image and the floor screen image can be realized as a single image.

INDUSTRIAL APPLICABILITY

A screen golf system and a method of realizing an image for screen golf according to the present invention are applicable to industries related to golf, in which a user may enjoy a round of virtual golf through golf simulation based on virtual reality.

The invention claimed is:

1. A screen golf system for realizing an image simulating a virtual ball on a virtual golf course so that a user plays virtual golf through the image as the user hits a golf ball toward a front screen, comprising:
   a first image output device for outputting a first image to a front screen provided in front of a location at which the user hits the golf ball on a shot plate, wherein the first image output device outputs the first image with a first resolution;
   a second image output device for outputting a second image to a floor screen provided on a floor between the shot plate and the front screen, wherein the second image output device outputs the second image with a second resolution being lower than the first resolution; and
   an image-processing device for generating the image simulating the virtual ball on the virtual golf course and transmitting the image to the first output device and the second output device so that the image is output to the front screen and the floor screen at the same time, wherein the image-processing device is configured:
   to generate the image simulating the virtual ball on the virtual golf course based on the first resolution,
   to divide the generated image into two parts so that one part corresponds to the first image and the other part corresponds to the second image, to transmit the divided part corresponding to the first image to the first image output device so as to be output to the front screen as the first image having the first resolution, to process the divided part corresponding to the second image to change from the first resolution to the second resolution, and to transmit the processed image having the second resolution to the second image output device so as to be output to the floor screen as the second image having the second resolution, wherein the second image output device outputs the second image so that a horizontal length of the second image is substantially equal to a horizontal length of the first image.

2. The screen golf system according to claim 1, wherein the image-processing device is configured:

to generate a two-dimensional image of a three-dimensional virtual golf course as the image simulating the virtual ball on the virtual golf course;

to transmit the first image of the three-dimensional virtual golf course to the first image output device so as to be output to the front screen; and to process a portion of the second image of the three-dimensional virtual golf course that corresponds to a land portion of the three-dimensional virtual golf course as a two-dimensional image and to transmit the processed image to the second image output device such that the land portion, is output to the floor screen.

3. The screen golf system according to claim 1, wherein the second image output device is configured to output the second resolution lower than the first resolution output from the first image output device, the image-processing device is configured to convert the second image so as to have an image size corresponding to the second resolution output from the second image output device, and to transmit the converted second image to the second image output device, and the second image output device is set and installed to output the second image received from the image-processing device such that a horizontal length of the second image received from the image-processing device is substantially equal to a horizontal length of the first image output from the first image output device.

4. The screen golf system according to claim 1, further comprising:

a camera device for acquiring an image having an angle of view comprising the front screen and the floor screen, wherein the image-processing device is configured to analyze the image acquired by the camera device in order to determine whether the image on the front screen and the image on the floor screen are offset from each other and, upon determining that the image on the front screen and the image on the floor screen are offset from each other, to control one of the first image output device and the second image output device in order to shift one of the image on the front screen and the image on the floor screen.

5. A method of realizing an image including a first image and a second image, the image simulating a virtual ball on a virtual golf course for screen golf in which the first image is output to a front screen provided in front of a location at which a user hits a golf ball and the second image is output to a floor screen provided on a floor between a shot plate on which the user hits the golf ball and the front screen, such that the first image on the front screen and the second image on the floor screen are output as a single image, the method comprising:

generating the image simulating the virtual ball on the virtual golf course based on a first resolution;

dividing the generated image into two parts so that one part corresponds to the first image and the other part corresponds to the second image, wherein the first image is to be output through a first image output device configured to output the first image to the front screen, the first image output device outputting the first image with the first resolution and the second image is to be output through a second image output device configured to output the second image to the floor screen, the second image output device outputting the second image with a second resolution which is lower than the first resolution;

transmitting the divided part corresponding to the first image to the first image output device so as to be output to the front screen as the first image having the first resolution;

processing the divided part corresponding to the second image to change from the first resolution to the second resolution; and transmitting the processed image having the second resolution to the second image output device so as to be output to the floor screen as the second image having the second resolution, wherein the second image output device outputs the second image so that a horizontal length of the second image is substantially equal to a horizontal length of the first image.

6. The method according to claim 5, wherein the step of generating the image comprises generating a two-dimensional image of a three-dimensional virtual golf course as the single image to be output, the step of transmitting the first image comprises transmitting the first image of the three-dimensional virtual golf course to the first image output device such that the first image output device outputs the first image to the front screen, and processing a portion of the second image of the three-dimensional virtual golf course that corresponds to a land portion of the three-dimensional virtual golf course as a two-dimensional image and transmitting the processed image to the second image output device such that the second image output device outputs the image of the land portion, connected to the image that is output to the front screen, to the floor screen.

7. The method according to claim 5, wherein the second image output device is configured to output the second resolution lower than the first resolution output from the first image output device, the second image is converted to have an image size corresponding to the second resolution output from the second image output device, and the second image output device is set to output the converted second image to the floor screen such that a horizontal length of the converted second image is substantially equal to a horizontal length of the first image output from the first image output device.

* * * * *